United States Patent [19]

Matsushita et al.

[11] Patent Number: 5,175,689
[45] Date of Patent: Dec. 29, 1992

[54] APPARATUS FOR PROCESSING TOOL PATH TO OBTAIN WORKPIECE EXAMINATION DATA

[75] Inventors: Hirokazu Matsushita; Yukio Hayakawa; Yoshiteru Iwata, all of Ooguchi, Japan

[73] Assignee: Kabushiki Kaisha Okuma Tekkosho, Aichi, Japan

[21] Appl. No.: 564,764

[22] Filed: Aug. 3, 1990

[30] Foreign Application Priority Data

Aug. 15, 1989 [JP] Japan .................................. 1-210385

[51] Int. Cl.⁵ .............................................. G05B 19/18
[52] U.S. Cl. ........................... 364/474.29; 364/474.03
[58] Field of Search .................... 364/474.03, 474.28, 364/474.29, 474.33, 474.37; 318/569, 570

[56] References Cited

U.S. PATENT DOCUMENTS

| | | | |
|---|---|---|---|
| 4,472,782 | 9/1984 | Suzuki | 364/474.03 |
| 4,641,270 | 2/1987 | Lalloz et al. | 364/476 |
| 4,868,761 | 9/1989 | Hayashi | 364/474.29 |
| 4,972,323 | 11/1990 | Cauwet | 364/474.29 |

*Primary Examiner*—Jerry Smith
*Assistant Examiner*—Paul Gordon
*Attorney, Agent, or Firm*—Wenderoth, Lind & Ponack

[57] ABSTRACT

A data processing apparatus generates data denoting a predetermined point on a virtual surface shape formed denoting the basis of digitized data on a tool path for an inverted shape work piece, to thereby facilitates examination of the size of the inverted shape work piece. That is, digitized data obtained by scanning a model shape is input and edited to prepare digitized data representing a tool path for machining a work piece. The digitized data representing the tool path is converted to prepare a numerical control working program. Work piece examination data are also prepared based on denoting an arbitrary measurement point of a scanning probe, data denoting the measuring direction at the measuring point and the digitized data representing the tool path for machining the work piece.

3 Claims, 3 Drawing Sheets

000
APPARATUS FOR PROCESSING TOOL PATH TO OBTAIN WORKPIECE EXAMINATION DATA

BACKGROUND OF THE INVENTION

1. Field of the Invention

The present invention relates to a digitized data processing apparatus which edits and converts digitized data obtained by scanning a model shape to be used in the preparation of an NC (numerical control) working program.

2. Description of the Prior Art

Conventionally, for formation of a mold having a freely curved surface, a model having the same shape as the mold is previously formed and profiling of the model is performed with a profile working machine. To form male and female mold parts, however, inverted models are required which are formed of plaster and which are difficult to form with accuracy. Moreover, the profiling speed using the profile working machine is considerably low.

With the advent of NC machine tools, the advantages of NC machining in terms of speed and reproducing performance have become known and some attempts have therefore been made to apply NC techniques to the formation of molds. For example, a digitizer apparatus has been developed which scans the surface of a model shape with a stylus (i.e., a probe) to obtain digitized data denoting stylus coordinate values, and which edits and converts the digitized data to prepare an NC working program. However, the NC working program thus formed only enables a process of working with a tool having the same shape as the stylus. That is, the conventional profile working process is merely separated into two processes associated through the NC working program.

An improved digitized data processing apparatus has also been developed which is capable of converting digitized data to enable working with a tool having a shape which is different from that of the stylus, which is capable of extracting a part of the digitized data corresponding to a particular work portion, and which is capable of preparing an NC working program for an inverted shape from the digitized data obtained by measuring the model without utilizing the digitized data on the inverted model. The above digitized data processing apparatus can prepare, by computation, suitable digitized data which is equivalent to corresponding data obtained with a digitizer apparatus based on equalizing the shape of the stylus to that of the desired tool and restricting the scanning range.

FIG. 1 is a block diagram of an example of the prior art digitized data processing apparatus. Digitized data DD (hereinafter referred to as "digitized measurement data") is stored in a digitized data memory means 2 via a digitized data input means 1. The digitized measurement data DD is read out of the digitized data memory means 2 and input to a digitized data editing means 3 where it is edited in accordance with an editing instruction DS input from a digitized data editing instruction input means 4 to form digitized data DO representing a tool path for working a work piece (which data is hereinafter referred to as "digitized tool path data"). The digitized tool path data DO is stored in the digitized data memory means 2. The digitized tool path data DO is read out of the digitized data memory means 2 and input to a digitized data NC program conversion means 5. An NC working program is thereby prepared and output.

The above digitized data processing apparatus enables an inverting processing to be performed as one of the steps for editing the digitized measurement data. That is, it can obtain, from the digitized measurement data of one model, digitized tool path data for the model shape (hereinafter referred to as "normal shape") and digitized tool path data for a shape formed by inverting the model shape (hereinafter referred to as "inverted shape"). Examination of the size of a normal shape work piece formed on the basis of a normal shape NC working program prepared by converting the digitized tool path data for the normal shape is performed by comparison measurement using a three-dimensional measuring apparatus. However, examination of the size of an inverted shape work piece formed on the basis of an inverted shape NC working program prepared by converting digitized tool path data for the inverted shape cannot be performed since there is no inverted shape model.

SUMMARY OF THE INVENTION

The present invention has been achieved under the above-described circumstances, and an object of the present invention is to provide a digitized data processing apparatus capable of preparing work examination data which enables the size of an inverted shape work piece to be examined even through there is no inverted shape model.

According to one aspect of the present invention, for achieving the objects described above, there is provided a digitized data processing apparatus in which digitized data obtained by scanning a model shape is input and edited to prepare digitized data representing a tool path for working a work piece, and in which the digitized data representing the tool path for working the work piece is converted to prepare a numerical control working program, said processing apparatus comprising work examination data preparing means supplied with data denoting an arbitrary measurement point on the work piece, data denoting the measuring direction at the measuring point and the digitized data representing the tool path for working the work piece, said work examination data preparing means calculating and outputting examination point coordinate values constituting work examination data on the basis of said categories of data.

The nature, principle and utility of the invention will become more apparent from the following detailed description when read in conjunction with the accompanying drawings.

DESCRIPTION OF THE PREFERRED EMBODIMENT

Figure 1:
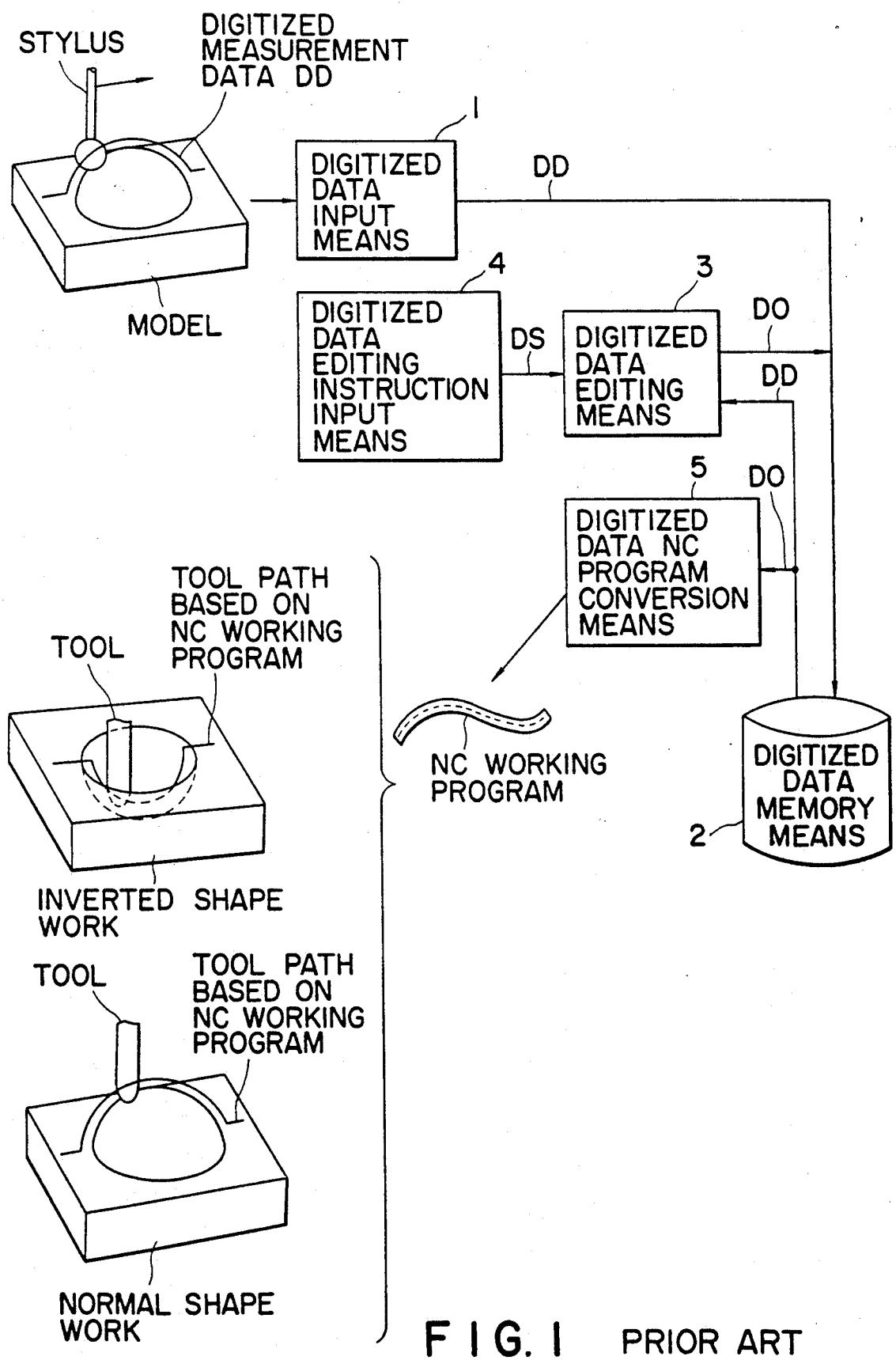
FIG. 1 is a block diagram of an example of the conventional digitized data processing apparatus.
Figure 2:
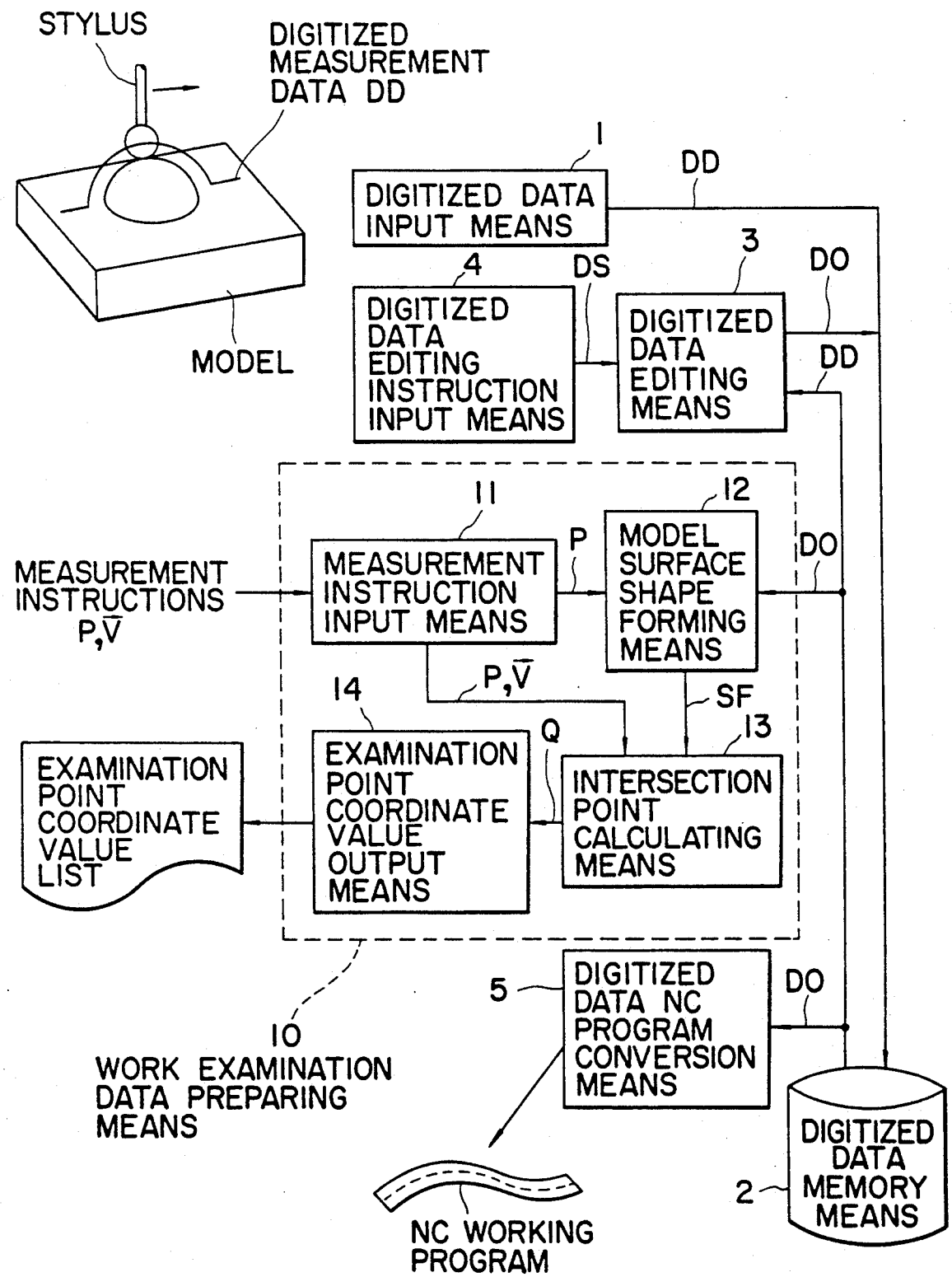
FIG. 2 is a block diagram of an example of a digitized data processing apparatus in accordance with the present invention.

Referring to FIG. 2, a digitized data processing apparatus in accordance with the present invention is illustrated in a manner to be easily compared with the arrangement shown in FIG. 1. Components identical or corresponding to those shown FIG. 1 are indicated by the same reference characters and the description thereof will not be repeated.

The digitized data processing apparatus of the present invention is provided with a work examination data preparing means 10 which includes a measurement instruction input means 11, a model surface shape forming means 12, an intersection point calculating means 13 and an examination point coordinate value output means 14. Data denoting a measurement point P and a measuring direction (the direction of movement of a probe) $\bar{V}$ at the measurement point P is input as measurement instruction data into the measurement instruction input means 11. The data denoting the measurement point P is sent to the model surface shape forming means 12 and the data denoting the measurement point P and the measuring direction $\bar{V}$ at the measurement point P is sent to the intersection point calculating means 13. Digitized tool path data DO for an inverted shape is read out of the digitized data memory means 2 and input to the model surface shape forming means 12, and data denoting a group of points PP in the vicinity of the measurement point P is extracted from the digitized tool path data DO for the inverted shape. A virtual surface shape SF corresponding to the shape of the model surface containing the group of vicinal points is formed, and data denoting the shape SF is sent to the intersection point calculating means 13. A point of intersection Q of the virtual surface shape SF and a straight line l passing through the measurement point P and extending in the measuring direction $\bar{V}$ at the measurement point P is calculated by the intersection point calculating means 13, and data denoting the point Q is sent to the examination point coordinate value output means 14. Coordinate values of the point of intersection Q are thereby output as examination point coordinate values constituting work examination data.

Figure 3:
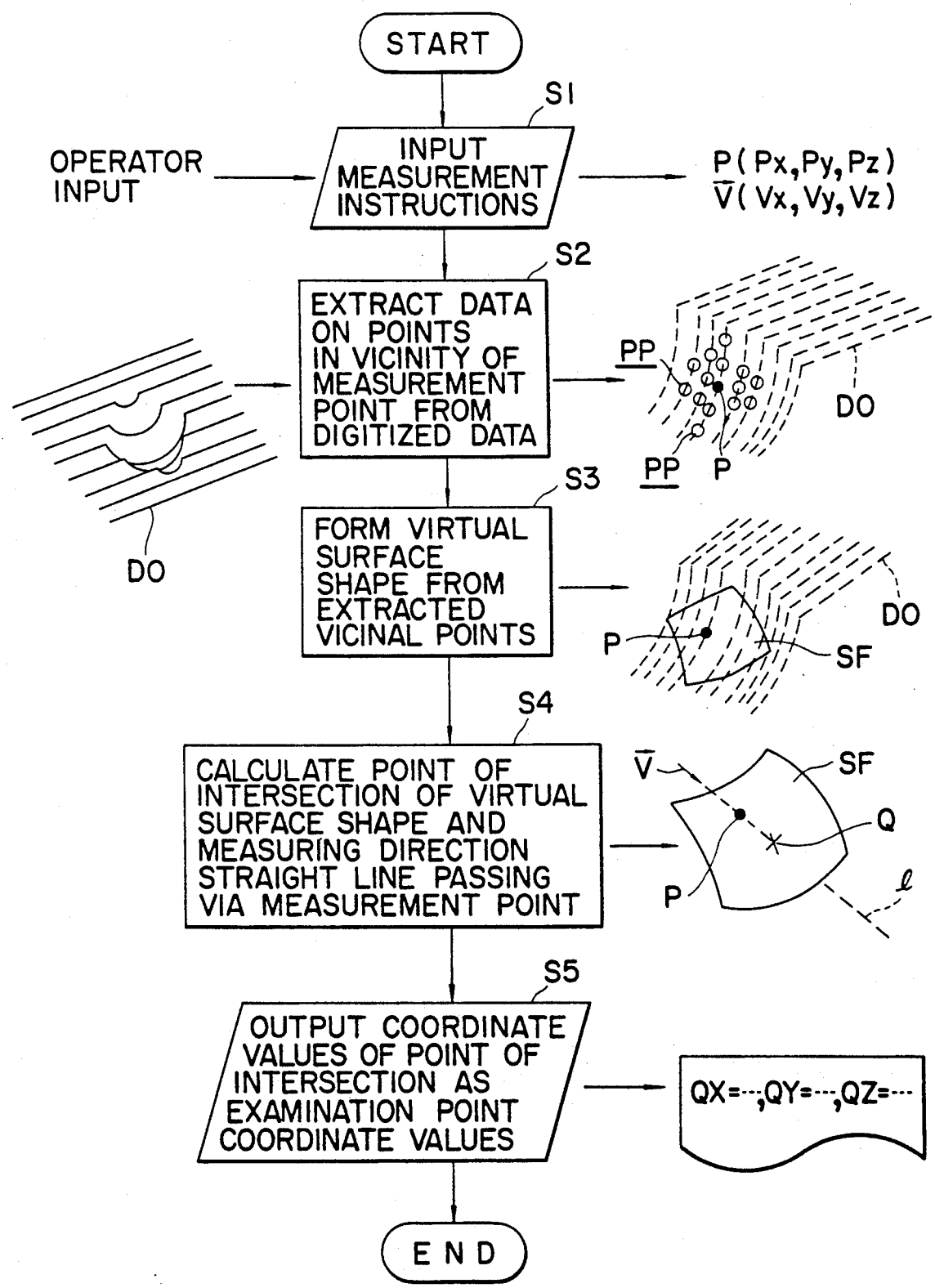
FIG. 3 is a flow chart of the operation of the processing apparatus shown in FIG. 2.

The operation of the thus-constructed processing apparatus will be described below with reference to the flow chart of FIG. 3. An operator inputs measurement instruction data denoting the measurement point P (Px, Py, Pz) and the measuring direction $\bar{V}$ (Vx, Vy, Vz) into the measurement instruction input means 11 (Step S1). The model surface shape forming means 12 reads out the digitized tool path data DO for the inverted shape from digitized data memory means 2, extracts data denoting the group of points PP in the vicinity of the measurement point P (Step S2), and forms the virtual surface shape SF containing the group of vicinal points (Step S3). The intersection point calculating means 13 calculates the point of intersection Q of the virtual surface shape SF and the straight line l passing through the measurement point P and extending in the measuring direction $\bar{V}$ at the measurement point P (Step S4), and the examination point coordinate value output means 14 outputs values of the coordinates of the point of intersection Q as examination coordinate values ($Q_x$, $Q_y$, $Q_z$) constituting work examination data (Step S5), thereby completing the overall process.

As described above, the digitized data processing apparatus in accordance with the present invention can automatically calculate work examination data with respect to a selected point on a finished inverted shape work piece. There is therefore no need to carry out the steps of forming and measuring the inverted shape model. Thus, the present invention is effective in terms of rationalization of the dimensional examination process.

It should be understood that many modifications and adaptations of the invention will become apparent to those skilled in the art and the invention is intended to encompass such obvious modifications and changes in the scope of the claims appended hereto.

What is claimed is:

1. A data processing apparatus comprising:
   means for preparing second digitized data denoting a tool path for machining a work piece by receiving and editing first digitized data denoting a configuration of a model obtained by scanning the model with a probe;
   means for processing the second digitized data and generating a corresponding numerical control machining program;
   means for inputting measuring point data and measuring direction data respectively denoting a measuring point and measuring direction of the probe; and,
   means for preparing and outputting work piece examination data denoting a plurality of point coordinate values of the work piece based on the second digitized data, the measuring point data and the measuring direction data.

2. An apparatus as recited in claim 1, wherein said work piece examination data preparing means comprises:
   means for extracting and generating, from the second digitized data, virtual surface shape data denoting a virtual surface shape defined by a group of points located in a vicinity of a measurement point of the measuring point data;
   means for determining coordinates of a point of intersection between the virtual surface shape and a straight line passing through the measurement point and extending in a measurement direction of the measuring direction data, wherein the coordinates of the point of intersection define the plurality of point coordinate values of the work piece denoted by the work piece examination data.

3. An apparatus as recited in claim 2, wherein the second digitized data denotes a tool path of an inverted model configuration.

* * * * *